United States Patent [19] [11] 4,256,709
Sizyakov et al. [45] Mar. 17, 1981

[54] METHOD FOR THE PRODUCTION OF ALUMINA

[76] Inventors: Viktor M. Sizyakov, ulitsa Vavilovykh, 7, korpus 3, kv. 94; Leonid F. Bilenko, Grazhdansky prospekt, 83, korpus 1, kv. 48; Nikolai S. Shmorgunenko, V.O., 1 linia, 28, kv. 15, all of Leningrad; Leonid I. Finkelshtein, ulitsa Chkalova, 45, kv. 2, Krasnoyarsky krai, Achinsk; Georgy P. Tkachenko, Slavyansky bulvar, 43, kv. 221, Moscow; Oleg V. Alexeev, 6 mikroraion, 11, kv. 63, Krasnoyarsky krai, Achinsk; Vitaly L. Aronzon, ulitsa Ivana Chernykh, 21, kv. 2, Leningrad; Pavel S. Vladimirov, ulitsa Olgi Forsh, 1, kv. 247, Leningrad; Alexei I. Alexeev, prospekt Solidarnosti, 9, korpus 2, kv. 155, Leningrad; Ivan M. Kostin, ulitsa Lensoveta, 60, kv. 63, Leningrad, all of U.S.S.R.

[21] Appl. No.: 46,755

[22] Filed: Jun. 8, 1979

[51] Int. Cl.³ .............................................. C01F 7/04
[52] U.S. Cl. .................................... 423/119; 423/127; 423/131; 423/121

[58] Field of Search ............... 423/111, 119, 121, 127, 423/131

[56] References Cited

U.S. PATENT DOCUMENTS

| | | | |
|---|---|---|---|
| 3,642,437 | 2/1972 | Angstadt et al. | 423/127 |
| 4,044,095 | 8/1977 | Hudson et al. | 423/119 |
| 4,113,833 | 9/1978 | Eremin et al. | 423/111 |

OTHER PUBLICATIONS

Mujahed et al., "Institution of Mining & Metallurgy, Transactions, Sect. C", Dec. 1974, pp. C241–C249.

Primary Examiner—Herbert T. Carter
Attorney, Agent, or Firm—Burgess, Ryan and Wayne

[57] ABSTRACT

An improved method for recovering aluminum values from alkaline aluminosilicate raw material by sintering a comminuted aqueous mixture of the alkaline aluminosilicate material, limestone and soda solution wherein the alumino-silicate material is first comminuted with the soda solution to form a mixture with a fraction of particles larger than 0.08 mm greater than 20 percent by weight, mixing limestone with the mixture and comminuting until the fraction of particles larger than 0.08 mm is between 2 and 15 percent by weight.

2 Claims, No Drawings

METHOD FOR THE PRODUCTION OF ALUMINA

The present invention relates to non-ferrous metallurgy, and more particularly, to the production of alumina obtained in the processing of alumina-containing raw materials.

FIELD OF APPLICATION

The present invention finds wide application in the metallurgical industry, in those branches thereof where aluminium is used, as well as in the production of Portland-cement-based materials. The invention finds application in the chemical industry in those processes which require the use of soda and potash.

BACKGROUND OF THE INVENTION

Known in the prior art is a method for the production of alumina from high-silica bauxites. According to this method crushed bauxite and limestone with fractions of 20 mm in an amount of 5 percent by weight are individually directed to respective tube mills. A soda solution containing 180 to 200 g/l of $Na_2O$ is fed simultaneously with bauxites and limestone to the mills. Bauxite is ground in tube mills till a fraction of 0.08 mm in an amount of 10 to 15 percent by weight is obtained in the slurry. The resultant slurry of bauxites and limestone are mixed to obtain molecular ratios $CaO:SiO_2=2:1$ $Na_2O:(Al_2O_3+Fe_2O_3)=1:1$ and moisture content of 35 to 40 percent.

Thereafter the mixed bauxite and limestone slurry is finally ground in tube mills to produce a homogeneous mixture. The resultant bauxite-limestone slurry having a moisture content of 40 percent is directed to correction basins where it is homogenized and corrected.

The corrected bauxite-limestone slurry having a moisture content of 35 to 40 percent and molecular ratios $CaO:SiO_2=2:1$ and $Na_2O:(Al_2O_3+Fe_2O_3)=1:1$ is sintered.

Since the bauxite-limestone slurry contains an increased amount of soda, such slurry is delivered to rotary sintering kilns through nozzles under a pressure of 10 to 18 atm. Sintering is conducted at a temperature of 1,250° to 1,300° C. for a period of from 30 minutes to one hour. The resultant sinter is cooled and ground to a particle size of 8 to 1 mm. The graded sinter is leached with an aluminate solution containing soda and caustic alkali resulting from the treatment of a soda solution containing 100 g/l of $Na_2O$ with calcium hydroxide. The leaching gives an aluminate solution containing 150 to 160 g/l of $Al_2O_3$ with a molecular ratio $Na_2O$ (caustic):$Al_2O_3=1.65:1$. The obtained aluminate solution is subjected to two-stage desilication. The first stage is effected in autoclaves at a temperature of 160° to 175° C. for 2 to 3 hours. After desilication in autoclaves the aluminate solution is separated from aluminosilicate mud by thickening it in Dorr thickeners. Then the clarified aluminate solution is desilicated by means of lime milk. The proportion of lime milk is 12 to 15 g/l of $CaO_{act}$. The slurry is maintained at a temperature of 95° C. for 4 hours. The desilication results in an aluminate solution containing 130 g/l of aluminium oxide having a molecular ratio $Na_2O$ (caustic):$Al_2O_3=1.55:1$, the content of $Na_2O$ being 15 g/l and that of $SiO_2$, 0.44 g/l.

The separation of aluminum hydroxide from the resultant solution is effected by feeding carbon dioxide from sintering kilns. The carbonate solution is fed for the preparation of bauxite-limestone charge. Aluminium hydroxide is separated from the aluminate solution by thickening the former in Dorr thickeners, and then it is subjected to two-stage washing with hot water in vacuum drum filters. The hydrate with a moisture content of 13 to 15 percent is fed to rotary tube kilns where it is calcined at a temperature of 1,250° to 1,300° C. According to this method alumina is produced with a silica content of 0.04 to 0.06 percent of $SiO_2$.

The main disadvantage of the above-described method is that bauxites and limestone are ground and the bauxite-limestone charge is prepared without due account for their physical characteristics, such as hardness. As a result, in the process of preparing the charge one of the components i.e. bauxites or limestone is over-comminuted to too fine particles, which brings about a distrubance in the stoichiometric ratios of the components in the process of the charge heat treatment. This leads to the formation of compounds from which alumina and alkali can not be practically extracted.

Also known in the art is a method for the production of alumina from an alkaline aluminosilicate raw material i.e. nepheline by sintering the latter with limestone and soda.

According to this method the limestone-nepheline charge is prepared in the following manner. The alkaline alumino-silicate material and limestone are ground separately in a soda solution in ball tube mills to produce fractions of 0.08 mm in an amount of 10 to 15 percent by weight and with a moisture content of 28 to 29 percent. The resultant nepheline and limestone slurries are mixed and finally ground in a tube mill in a proportion which ensures a molecular ratio in the charge of $CaO:SiO_2=(2\pm0.3):1$. Thereafter the nepheline-limestone slurry is directed to correction basins where it is homogenized and corrected. The corrected slurry with a molecular ratio of $CaO:SiO_2=2:1$ and a moisture content of 20 to 30 percent is directed to rotary kilns where sinter is formed at a temperature of 1,250° to 1,300° C. The resultant sinter is cooled and subjected to crushing to a particle size of 8 mm. Thereafter the sinter is leached with an aluminate solution containing caustic alkali in ball tube mills. The aluminate solution is then separated from the belite mud and subjected to two-stage desilication. The first stage of desilication is carried out in autoclaves and the second, under atmospheric conditions in the presence of lime milk. After the two-stage desilication the aluminate solution is subjected to carbonation with flue gases from sintering kilns. As a result, aluminium hydroxide is separated from the solution. Aluminium hydroxide separated after two-stage washing is subjected to heat treatment at a temperature of 1,250° to 1,300° C.

The above-described method makes it possible to produce alumina containing 0.04 to 0.07 percent by weight of $SiO_2$. Soda, potash and Portland cement are obtained from intermediates of alumina production, i.e. from carbonate solution and belite mud.

However, the above-described individual grinding of the alkaline aluminosilicate raw material and limestone in tube mills with subsequent final grinding in similar apparatus results in a limestone-nepheline charge in which the entire limestone component is comminuted to too fine particle size, whereas the ore component is comminuted to too coarse particle size. The feeding of such a charge to kilns during its heat treatment leads to an increased dust entrainment, mainly of the limestone component, from the kilns which results in a decrease in the molecular ratio $CaO:SiO_2$ in the limestone-nepheline charge; consequently, no complete decomposition of the alkaline aluminosilicate rock takes place, i.e. the yield of alumina and alkali is 2 to 3 percent lower. In addition, the increased dust entraintment from kiln necessitates an increase in the moisture content of the limestone-nepheline charge to 32 percent, which lowers the productivity of sintering kilns in terms of sinter by 10 to 15 percent.

It is an object of the present invention to provide such a method which would make it possible to extract a higher amount of alumina from the limestone-nepheline charge.

BRIEF DESCRIPTION OF THE INVENTION

Said object is achieved by that in the production of alumina comprising preparing the charge by mixing alumina-containing raw material with carbonate raw material and a solution containing soda; comminuting the resultant mixture; correcting said mixture and sintering the charge obtained; leaching the resultant sinter; desilicating the aluminate solution resulting from leaching the sinter; separating aluminium hydroxide by carbonating and decomposing the aluminate solution and subsequently calcining the resultant aluminium hydroxide, according to the present invention, the preparation of the charge is carried out by comminuting the alumina-containing raw material in a solution containing soda to produce a comminuted alumina-containing material with a fraction of more than 0.08 mm in an amount of over 20 percent by weight, subsequently mixing said comminuted alumina-containing raw material with the carbonate raw material and a solution containing soda, in a weight ratio ensuring a molecular ratio of alkali metal oxide to alumina of at least 1 to 1 and a molecular ratio of calcium oxide to silica of $2 \pm 0.03$ to 1 and simultaneously comminuting all the solid components of this charge to produce a comminuted charge with a fraction of particles larger than 0.08 mm in an amount of 2 to 15 percent by weight.

The new method makes it possible to obtain after grinding 60 to 80 percent of the charge of a required chemical and grain size distribution composition, i.e. one which does not need correcting, as compared to 10 to 20 percent according to the known method. The fluctuations in the chemical and grain size distribution composition of the charge are sharply reduced. All this results in a 10 to 15 percent increase in the productivity of sintering kilns and a 3 to 5 percent increase in the extraction of alumina and potassium and sodium oxides from the sinter. The number of vessels required for correcting the charge is twice or thrice reduced and the capital investment in dust removal from waste gases of sintering kilns is 10 to 20 percent lower. In addition, power consumption for the preparation of the charge is reduced by 20 to 30 percent and compressed air consumption is two to three times less than in the known method.

Further objects and advantages of the present invention will be understood from the following detailed description of the method for the production of alumina and the examples of the embodiment thereof.

DETAILED DESCRIPTION

The present invention substantially resides in the following.

An alkaline aluminosilicate rock, such as the nepheline rock, is ground in tube mills in a soda solution to reach a moisture content of 30 to 50 percent and the content of particles of a size of 0.08 mm in an amount of more than 20 percent by weight, preferably 20 to 40 percent by weight. In case the rock is ground to finer particles a high dust loss of the aluminosilicate rock takes place in further sintering of such a charge, which result in a reduction of the extraction of alumina down to 2 percent.

When the rock is ground to particles of a larger size the reactions of formation of alkali metal aluminates in the course of further sintering will not be complete, which also adversely affects the yield of alumina.

The comminuted nepheline rock is mixed with a carbonate raw material, such as limestone, having a particle size of 20 mm, and a solution containing soda in a ball tube mill in a proportion which ensures the obtaining in the limestone-nepheline slurry having a molecular ratio of calcium oxide to silica as high as $2.0 \pm 0.03$ to 1 and a molecular ratio of alkali metal oxide to aluminua (i.e. $Na_2O:Al_2O_3$) exceeding or equal to 1:1. The crushed ore and large-size limestone are ground together. Since the hardness of the nepheline ore is twice that of limestone, at this stage of the preparation of the limestone-nepheline charge the nepheline fraction of the slurry is finally ground while the limestone fraction is ground insignificantly. Limestone is ground directly by means of the nepheline ore as a component having a higher hardness than limestone.

At this stage of the preparation of the limestone-nepheline charge a material with uniform grain size is obtained with oversize of 0.08 mm in an amount of 6 to 15 percent by weight and a moist-content of 28 to 30 percent.

The selection of oversize of 0.08 mm within said range is due to the following reasons. The amount of the 0.08 mm oversize residue of less than 2 percent by weight involves additional expenditures, since the consumption of grinding bodies and electric power consumption increase. The upper limit of the 0.08 mm oversize residue of 15 percent by weight is determined by the process of sintering the limestone-nepheline charge and extraction of alumina and alkalis. When the charge containing more than 15 percent by weight of the 0.08 mm oversize is sintered, extraction of alumina and alkalis is 3 to 5 percent lower.

After the grinding the limestone-nepheline charge contains of more than 2 percent by weight of 0.08 mm oversize residue. The molecular ratio of calcium oxide to silica in the 0.08 mm oversize is equal to or exceeds 3, which shows that the grinding of limestone is coarser and that of the nepheline ore is finer.

The limestone-nepheline slurry after final grinding is directed to correction basins where it is homogenized as regards its grain size distribution and the chemical composition, and corrected. Thereafter the limestone-nepheline charge having a moisture content of 28 to 30 percent, a molecular ratio of calcium oxide to silica equal to $2 \pm 0.03$ to 1 and a molecular ratio of alkali metal oxide to silica of more than or equal to 1 to 1, is directed to rotary sintering kilns wherein the charge is heat treated at a temperature of 1,250° to 1,300° C. The sinter is leached with a soda-alkaline solution, containing, for example, 20 g/l of soda, in rod mills. The aluminate solution is separated from the belite mud and subjected to two-stage desilication. The first stage of desilication is carried out in autoclaves, and the second, under atmospheric conditions in the presence of lime milk.

The aluminate solution after two-stage desilication is subjected to carbonation with flue gases from sintering kilns. Carbonation gives aluminium hydroxide and a soda solution. The latter is returned to the initial stage of the process for the preparation of the limestone-nepheline charge.

After washing aluminium hydroxide is subjected to heat treatment at 1,250° to 1,300° C. in a rotary kiln or a fluidized bed furnace.

The present invention is aimed at increasing the extraction of alumina by improving the grain size distribution and chemical composition of the charge.

The process of sintering the limestone-nepheline charge is carried out in rotary kilns.

The decisive stage of the process of sintering the charge, i.e. decomposition of the aluminosilicate raw material with limestone to form aluminate and silicate phases of the sinter, depends on the ratio of particle sizes of the nepheline ore and limestone in the charge.

In sintering the limestone-nepheline charge with the too fine limestone component in a rotary kiln entrainment of the limestone component takes place, which results in disturbing of the stoichiometric ratio in the charge and, hence, in reduction of alumina yield from the nepheline raw material.

The application of the present invention makes it possible to obtain a limestone-nepheline charge wherein the limestone and the nepheline components have particles of the same size.

According to the method proposed in the present invention alumina is produced, which contains 0.04 to 0.07 percent of $SiO_2$.

Soda, potash and Portland cement are obtained from the intermediates of alumina production i.e. soda solution and belite mud.

As a result of employing the novel method a limestone-nepheline charge is obtained with uniform grain size distribution and chemical composition. Such a charge makes it possible to increase the productivity of sintering kilns as regards the sinter by 10 to 15 percent. Reduction in dust entrainment from sintering kilns improves the process properties of the sinter due to more complete decomposition of the alkaline aluminosilicate rock, which makes it possible to raise the extraction of alumina alkalis by 3 to 5 percent. In addition, consumption of electric power for the preparation of the charge is reduced by 20 to 30 percent, and consumption of compressed air is 2 to 3 times lower than in the prior-art method.

EXAMPLE 1

Alumina-containing raw material, for example, nepheline ore is comminuted in mill units in a solution containing soda, to obtain a 0.08 mm oversize residue in an amount of 25 percent by weight. The partly comminuted nepheline slurry is mixed in a tube mill with limestone and soda solution containing 5 g/l of alkalis in a weight ratio which ensures a molecular ratio in the charge of alkali metal oxide to alumina of about 1 to 1 and a molecular ratio of calcium oxide to silica of about 2 to 1, with simultaneous comminution of all the solid components of this charge to obtain a 0.08 mm fraction in an amount of 6 percent by weight. The charge thus produced is homogenized, corrected and directed to sintering kilns. The charge is sintered at a temperature of 1,250° to 1,300° C. The resultant sinter is leached with a soda-alkali solution. From the sinter containing 15 to 16 percent by weight of aluminium oxide, 9 to 10 percent by weight of alkalis and 70 percent by weight of dicalcium silicate, there are extracted 87 to 88 percent of aluminium oxides and 88 to 90 percent of alkalis. The aluminate solution resulting from leaching is separated from the belite mud and subjected to two-stage desilication. The first stage is conducted in autoclaves and the second, under atmospheric conditions in the presence of lime milk.

After two-stage desilication the aluminate solution is carbonated with flue gases from sintering kilns. Carbonation gives aluminium hydroxide and soda solution. The latter is directed to the preparation of limestone-nepheline charge.

After washing the separated aluminium hydroxide is heat treated at a temperature of 1,250° to 1,300° C. in a rotary kiln or a fluidized bed furnace. Alumina is produced which contains 0.04 to 0.07 percent of $SiO_2$.

Soda, potash and Portland cement are obtained from the intermediates of alumina production, i.e. soda solution and belite mud.

EXAMPLE 2

Alkaline aluminosilicate raw material containing 17.40 percent of $Al_2O_3$ and 9.8 percent of alkalis is comminuted in a mill in a soda solution containing 80 g/l of alkalis to obtain a fraction of more than 0.08 mm in an amount of 36 percent by weight. The resultant slurry is mixed with limestone and soda solution, containing 80 g/l of alkali, in an amount which ensures a molecular ratio in the charge of alkali metal oxide to alumina of 1.02 to 1 and a ratio of calcium oxide to silica of 2.0 to 1.0, after which the mixture is ground to produce a fraction of more than 0.08 mm in an amount of 15 percent by weight. The obtained charge is processed by following the procedure described in Example 1.

As a result of employing this method a plant having a capacity of 200,000 tons of alumina a year additionally produces:

| | |
|---|---|
| alumina | 8,000 t |
| soda | 3,200 t |
| potash | 4,100 t; | and saves:

| | |
|---|---|
| electric power | 20,000,000 kWh; |
| compressed air | 8,000,000 $Nm^3$. |

EXAMPLE 3

Alkaline aluminosilicate raw material containing 19.8 percent of $Al_2O_3$ and 11.7 percent of alkalis is comminuted in mill units in a soda solution containing 70 g/l of alkali to produce a fraction of more than 0.08 mm in an amount of 30 percent by weight. The resultant slurry is mixed with limestone and soda solution containing 70 g/l of alkali in an amount which ensures a molecular ratio in the charge of alkali metal oxide to alumina equal to 1.0 to 1.0 and a ratio of calcium oxide to silica of about 2.0 to 1.0; thereafter the obtained mixture is subjected to comminution to produce a fraction of more than 0.08 mm in an amount of 12 percent by weight. The charge obtained is processed by following the procedure described in Example 1.

As a result of employing this method a plant having a capacity of 200,000 tons of alumina a year additionally produces:

| | |
|---|---|
| alumina | 6,900 t |
| soda | 3,800 t |
| potash | 1,400 t | and saves:

| | |
|---|---|
| electric power | 21,000,000 kWh |
| compressed air | 7,000,000 Nm$^3$ |

What is claimed is:

1. In a method for the production of alumina which comprises forming a mixture by mixing and grinding an alkaline aluminosilicate raw material, limestone and a soda containing solution, correcting the mixture to obtain therein molecular ratios of $CaO:SiO_2$ of $2\pm0.03$ and $Na_2O:(Al_2O_3+Fe_2O_3)$ of about 1, heating the corrected mixture at a temperature of, 1250° to 1300° C. to form a sinter, leaching the sinter to form an aluminate solution, desilicating the aluminate solution, carbonating the desilicated aluminate solution to form aluminum hydroxide, and calcining the aluminum hydroxide to form alumina the improvement which comprises:

(a) Comminuting the alkaline aluminosilicate with an aqueous soda containing solution in an amount to form a mixture containing from 30 to 50 percent water by weight to form a comminuted mixture wherein the weight fraction of particles larger than 0.08 mm is greater than 20 percent;

(b) mixing the comminuted mixture with limestone and additional soda solution to form a mixture having molecular ratios of $CaO:SiO_2$ of $2\pm0.03$ and $Na_2O:(Al_2O_3+Fe_2O_3)$ of about 1

(c) comminuting the mixture formed in step (b) until the fraction of particles larger than 0.08 mm is from 2 to 15 percent by weight and (d) heating the mixture of step (c) to form the sinter.

2. The method of claim 1 wherein in the comminuted mixture of step (a), the fraction of particles larger than 0.08 mm is from 20 to 40 percent by weight.

* * * * *

UNITED STATES PATENT OFFICE
CERTIFICATE OF CORRECTION

Patent No. 4,256,709     Dated March 17, 1981

Inventor(s) Viktor M. Sizyakov, et al

It is certified that error appears in the above-identified patent and that said Letters Patent are hereby corrected as shown below:

Column 2, line 16: "distrubance" should be --disturbance--.

Column 3, line 29: "more" should be --particles larger--.

Column 4, line 6: "result" should be --results--.

Column 5, line 45: After "alumina" insert --and--.

Signed and Sealed this

Twenty-fifth Day of August 1981

[SEAL]

Attest:

GERALD J. MOSSINGHOFF

Attesting Officer     Commissioner of Patents and Trademarks